United States Patent [19]

DeWitt et al.

[11] Patent Number: 5,073,136
[45] Date of Patent: Dec. 17, 1991

[54] COLLAPSIBLE SONOBUOY FLOATATION DEVICE

[75] Inventors: Paul H. DeWitt; James J. Majewski; Thomas A. Richter, all of Fort Wayne, Ind.

[73] Assignee: Magnavox Government and Industrial Electronics Company, Fort Wayne, Ind.

[21] Appl. No.: 501,051

[22] Filed: Mar. 29, 1990

[51] Int. Cl.$^5$ .............................................. B63B 22/08
[52] U.S. Cl. ........................................ 441/7; 441/30; 441/32; 441/21; 441/11
[58] Field of Search ...................... 441/1, 6, 7, 9–11, 441/21–23, 24, 28, 30–33; 114/54; 367/3, 4

[56] References Cited

U.S. PATENT DOCUMENTS

| 3,382,514 | 5/1968 | Boscov | 441/30 X |
| 3,864,771 | 2/1975 | Bauer et al. | 441/30 X |
| 4,208,738 | 6/1980 | Lamborn | 441/11 X |

FOREIGN PATENT DOCUMENTS 1088294 10/1967 United Kingdom ................. 114/54

Primary Examiner—Ed Swinehart
Attorney, Agent, or Firm—Roger M. Rickert; Richard T. Seeger

[57] ABSTRACT

A surface unit for a sonobuoy or similar device is disclosed and includes a variable volume sealed chamber and an arrangement including a pressurized carbon dioxide cartridge within the sealed chamber which, when energized, releases the carbon dioxide and increases the chamber volume from a collapsed volume to an expanded significantly greater volume. Electronic circuitry including radio transmitter circuitry is included within the sealed chamber along with a radio transmitter antenna which is within the sealed chamber and coupled to the radio transmitter circuitry. Expansion of the float sealed chamber functions to erect the antenna preparatory to transmission. The variable volume sealed chamber is formed of a semi-rigid plastic cup having a generally cylindrical corrugated sidewall portion, a closed end describing one of the chamber ends and a rigid base member sealed to the cup sidewall portion remote from the closed end and describing the other of the chamber ends. As it expands, cylinder length is directly proportional to cylinder volume.

8 Claims, 5 Drawing Sheets

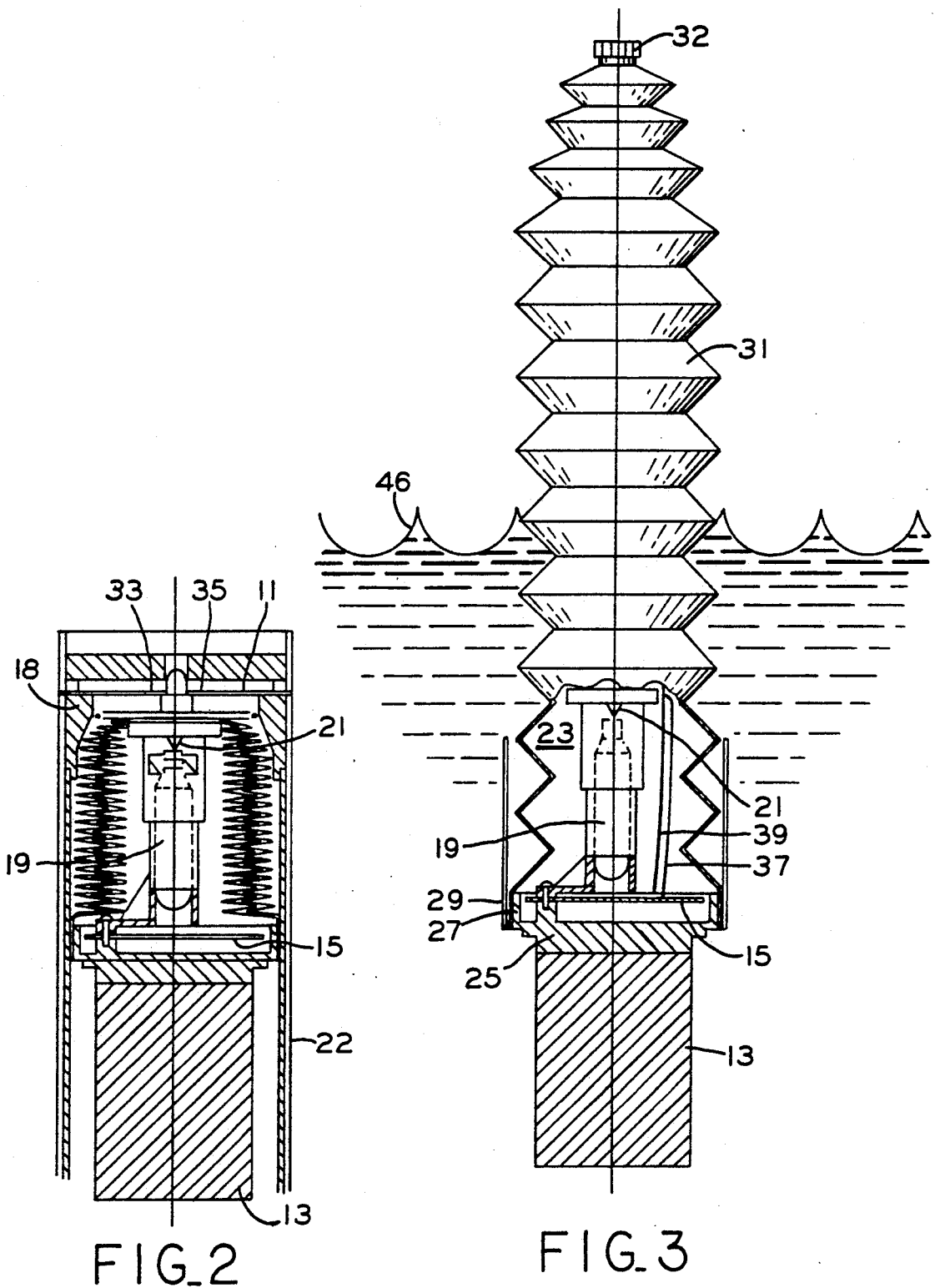

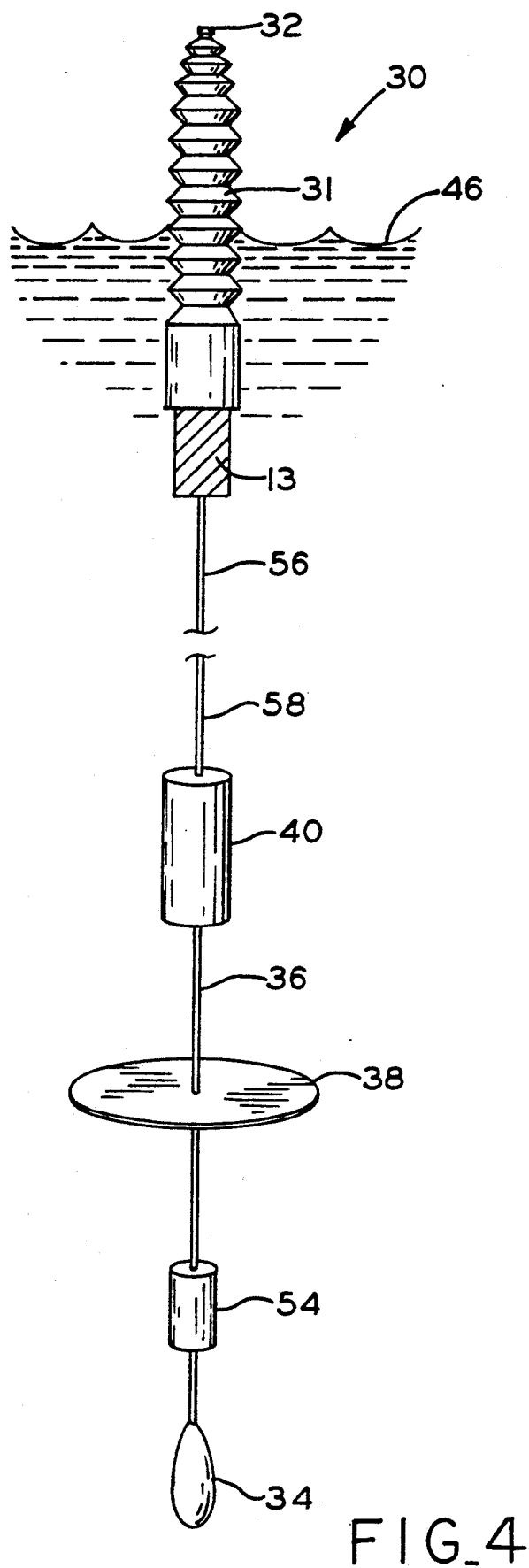
FIG_4

COLLAPSIBLE SONOBUOY FLOATATION DEVICE

The present invention relates generally to a buoy surface unit and more particularly to a collapsible blow molded shape which may be deployed with and provide flotation for a sonobuoy or similar device.

A sonobuoy is a device frequently adapted to be dropped from an aircraft and typically including a parachute or free-wheeling propeller (e.g., rotochute) to retard its velocity providing a controlled descent to the surface of the water and insuring that the device impacts the water surface in an approximately vertical attitude. Such a sonobuoy typically comprises a subsurface hydrophone for detecting underwater sounds in either an active or passive manner and transducing them into electrical signals to be subsequently transmitted by a surface buoy-contained transmitter to air or surface craft. Sonobuoys are typically used for submarine detection or tracking, however, their hydrophones or underwater sonic receivers as well as underwater projectors or sound transmitting devices find a wide range of other applications in underwater exploration, depth finding and other navigational tasks, and commercial as well as recreational fishing. When the sonobuoy hits the water, the impact or some other prescribed condition (such as time, depth or presence of seawater) triggers a sequence of events which may include release of the parachute, deployment of a surface unit, erection of an antenna, and separation of the hydrophone which sinks to a prescribed operating depth. Sea water may flow into a water actuated battery to provide energy for the transmitter and other components and energization of such a battery may function as the prescribed condition which triggers this or a similar sequence of events.

Illustrative of the sonobuoy art are U.S. Pat. No. 4,590,590; U.S. Pat. No. 4,654,832; and U.S. Pat. No. 4,689,773. As illustrated by these patented devices, the buoy casing or outer canister may contain a multitude of components such as a parachute, hydrophone, cable packs, floats, sea anchor, and the radio transmitter and associated antenna. A solid canister is used as the float element in these illustrative patented arrangements, but flexible inflatable float elements have also been suggested. Certain of the parts separate from others when prescribed conditions are met, but in each case, when the system is deployed, there is an antenna extending upward from the surface of the water and a submerged hydrophone or similar electroacoustic transducer suspended beneath the surface unit.

For example, it is known to employ an inflatable float bag of heavy flexible plastic material which is inflated from a pressurized canister. A bendable retaining plate is mounted in one end of the buoy casing. When the bag pressure is sufficiently high, a bending force is applied to the plate causing it to buckle and be ejected from the outer casing whereupon the parachute shroud lines and shroud line retaining device are ejected and the bag exits the casing and rises to the water surface.

Turning now to a quite dissimilar discipline, accordion or bellows shaped collapsible bottles have been known for a number of years and have found some commercial success as liquid soap dispensers and as shipping containers for concentrated materials which are to be diluted at a remote site by the consumer using the bottle (now expanded) in which they were shipped. A multi-purpose self-inflating bellows is described in U.S. Pat. No. 3,201,111 to be used as a pad or cushion. A collapsible bottle having two stable positions (expanded and collapsed) is described molding technique to have alternate longer and shorter conical sections adjacent ones of which may be at either an obtuse (expanded) or an acute (collapsed) angle to one another with some deformation being needed to move them from one angular orientation to the other.

Blow molding of plastic materials is a technique similar to the time-honored technique for blowing glass bottles. A tube of thermoplastic material is extruded or injected into a mold, the mold closed and air introduced to expand the tube out against the sides of the mold. Air pressure is maintained to hold the material against the inner mold surface long enough to solidify and thereafter, the blow molded object is ejected from the mold by an air jet. U.S. Pat. No. 4,492,313 describes in great detail, a collapsible bottle made by such blow molding techniques.

Among the several objects of the present invention may be noted the provision of a multifunction surface unit for a buoy; the provision of a blow molded plastic member which may have mechanically stable collapsed and expanded states for use as a readily inflatable float; the provision of a plastic member in accordance with the previous object which functions to extend a radio transmitter antenna when inflated to its expanded state the provision of a plastic member in accordance with either of the previous objects which also functions to seal electronic circuitry including radio transmitter circuitry within the surface unit: the provision of a blow molded plastic member for use as a readily inflatable float which may have mechanically unstable collapsed and expanded states in which the plastic is stressed, and a stable intermediate state; the provision of an inexpensive expansible member for a sonobuoy; the provision of a variable volume constant surface area float for a sonobuoy; the provision of a sealed electronics containing variable volume chamber in a sonobuoy; and the provision of a sonobuoy surface unit which, in addition to its function as a float, provides (1) a force for initially separating or deploying the several components in the buoy casing, (2) an expansive motion to erect a radio transmitter antenna, and (3) a sealed environment for the buoy electronics. These as well as other objects and advantageous features of the present invention will be in part apparent and in part pointed out hereinafter.

In general, a surface unit member for a buoy is formed from a variable volume sealed chamber which has a relatively constant (volume independent) surface area as opposed to structures similar to a balloon the surface area of which increases greatly when the volume increases as the balloon is inflated. A compressed gas device is included within the sealed chamber and, when energized, releases gas to increase the chamber volume from a collapsed volume to an expanded and significantly greater volume. A radio transmitter antenna may also be included within the sealed chamber and chamber volume expansion utilized to extend the antenna. The variable volume sealed chamber, at least for the expanded volume, and, in the preferred form, in both the expanded and collapsed states, is generally cylindrical in shape. The antenna may be an elongated flexible conductor having one end fastened near each of the opposed cylinder ends, and more typically is formed of several such conductors, to be extended as the cylinder axial length increases with increased volume.

Also in general and in one form of the invention, a surface unit member for a buoy in the form of a variable volume sealed chamber has within the sealed chamber an arrangement for increasing the chamber volume from a collapsed volume to an expanded volume significantly greater than the collapsed volume. Radio transmitter circuitry may be included within the sealed chamber along with a radio transmitter antenna which is coupled to the radio transmitter circuitry and extended for use by the increase in chamber volume. The variable volume sealed chamber may be formed of a semi-rigid plastic cup having a generally cylindrical corrugated sidewall portion and a closed end describing one of the chamber ends with a rigid base member sealed to the cup sidewall portion remote from the closed end and describing the other of the chamber ends. In this configuration, chamber volume is directly proportional to cylinder length with the surface area and mean cylinder diameter being constant.

BRIEF DESCRIPTION OF THE DRAWING

FIG. 2 is a view in cross-section of a portion of the sonobuoy of FIG. 1 showing the float in the collapsed state;

FIG. 3 is a view in cross-section of a portion of the sonobuoy of FIG. 1 showing the float in the expanded state;

FIG. 4 is an illustration of the sonobuoy of FIG. 1 fully deployed:

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
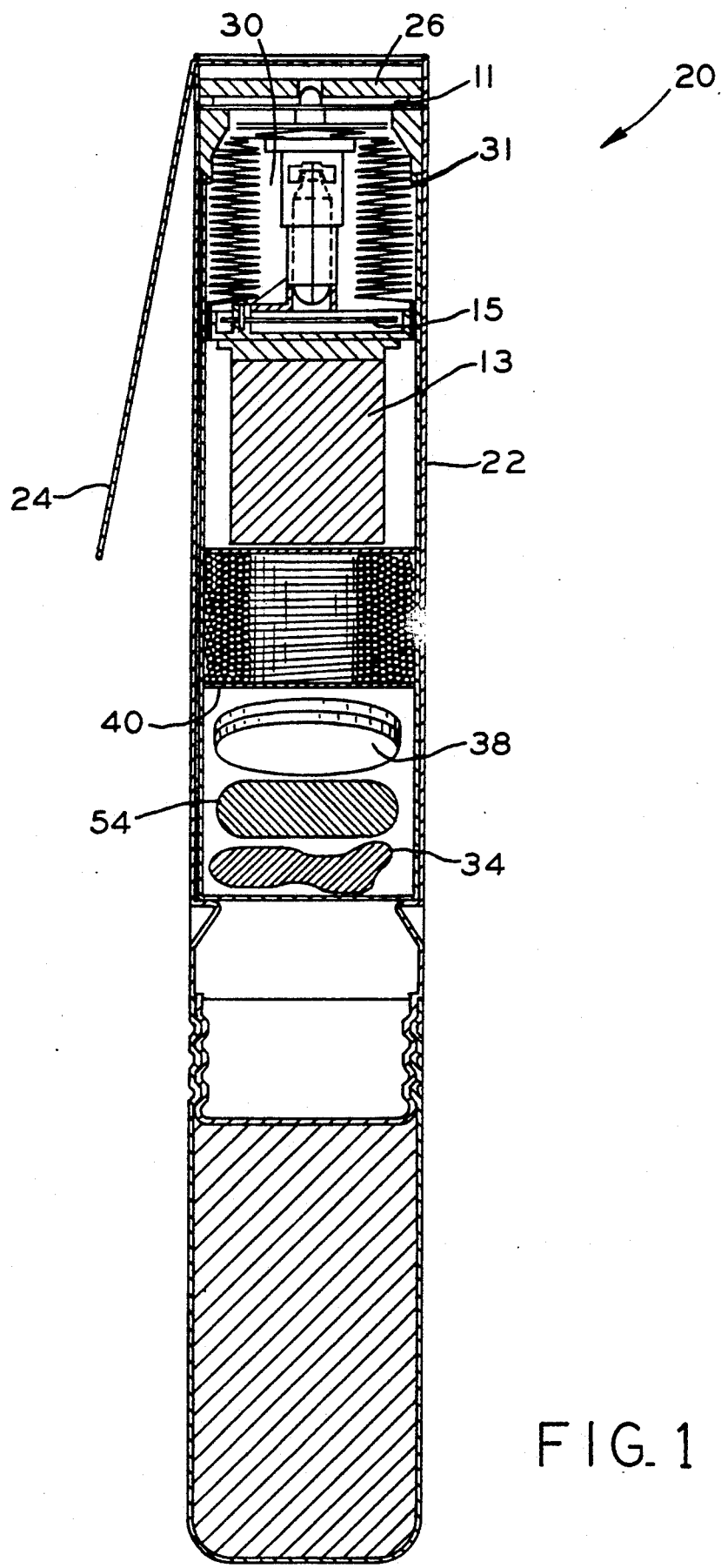
FIG. 1 is a vertical section of a sonobuoy prior to deployment illustrating the present invention in one form.

Referring first to FIGS. 1 and 4, a sonobuoy 20 prior to deployment has a cylindrically tubular outer casing 22 wind blade 24 at the outside upper end thereof and inside thereof in descending order; parachute 26 having a parachute release mechanism including the blade 24, and surface unit or floating portion 30 including the float or bellows 31. Surface unit 30 is connected to upper end of electrically conductive upper compliance cable 56 the lower end of which is connected to the o upper end of electrically conductive hard cable 52 the lower end of which is connected to the upper end of lower compliance cable 36. Cables 56 and 36 are relatively short and resilient to reduce vibration shock while cable 58 is longer and is dimensioned to provide the desired depth of hydrophone 54. The lower end of cable 36 is connected to the top of sea anchor 32 the lower end of which is connected to hydrophone 54. In the deployed condition shown in FIG. 4, casing 22 and its ballast 32 is free of its previous contents and sinks to the bottom. An additional ballast weight 34 which helps in extending the cables is also sometimes employed. Cables 86, 56 and 58 are initially contained within a cable pack enclosure 40.

Sonobuoy 20 is dropped or launched from an aircraft and blade 24 is wind actuated in conventional manner to deploy parachute 26 having a plurality of shroud lines connected to the casing 22 by elements including the release plate 11.

Figure 8:
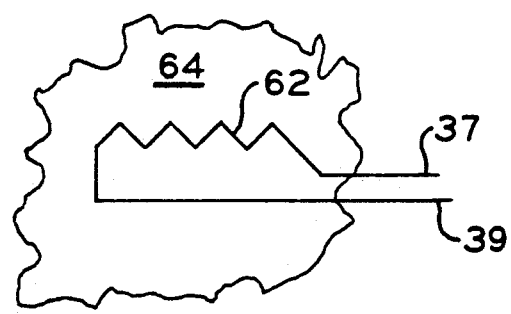
FIG. 8 is a fragmentary plan view of a membrane and resistance wire to be held in place by a threaded retaining ring atop the bellows.

Referring to FIGS. 2 and 8, after casing 22 enters the water, water floods sea water battery 13 and the battery 13 provides current to the electronics components on transmitter circuit board 15 and the other components as needed. Thus, the salt water provides the missing electrolyte and thereby actuates the battery. In particular, a current flows to actuate an explosive squib in a known manner to drive the pin 21 against compressed gas cartridge 19 puncturing the end of the cartridge and releasing carbon dioxide or similar gas to fill the region 23. Note that the compressed gas cartridge 19 is within the sealed region 28 and no connection to the now open end of the cartridge 19 is needed.

Region 23 is a sealed region defined below by rigid plate 2 having an annular rim 27 which sealingly receives the lower skirt 29 of bellows 81 and forming therewith the surface unit 30. Bellows 81 exerts an increasing upward force on release plate 11 as more gas is released into region 28 which force eventually causes plate 11 to buckle or bend at the weakened regions indicated generally at 88 and 35 and, with additional bending, the ends of the plate 11 slip free of the sidewalls of the casing 22 separating the release plate 11 and the attached parachute shroud line retaining cup 18 from the casing. With release plate 11 and retaining cup 18 gone, the chamber 28 is free to continue expansion and surface unit 80 is ejected upwardly. A helper spring may sometimes be employed to aid ejection of the surface unit upwardly. A pair of flexible antenna wires 87 and 39 are connected at one end to the transmitter circuit board 15 and at the other end to the upper end of the bellows 31 so that as the chamber expands, the wires 87 and 39 are straightened out and extend upwardly from the water surface 46 within the bellows 3 to provide an antenna for transmission of buoy information.

The surface unit itself is a variable volume sealed chamber of a generally cylindrical configuration with the sidewall corrugated or shaped like a bellows as best seen in FIGS. 2 and 3, and 5 and 6. The upper part of the surface unit is formed of a semi-rigid plastic cup having a corrugated sidewall portion and a closed end describing one of the cylinder ends. A rigid base member 25 which supports the transmitter circuit board 15 as well as the compressed gas source 19 has a rim 27 which is sealed to the cup sidewall portion (skirt 29) and describes the other of the cylinder ends.

Figures 5, 6:
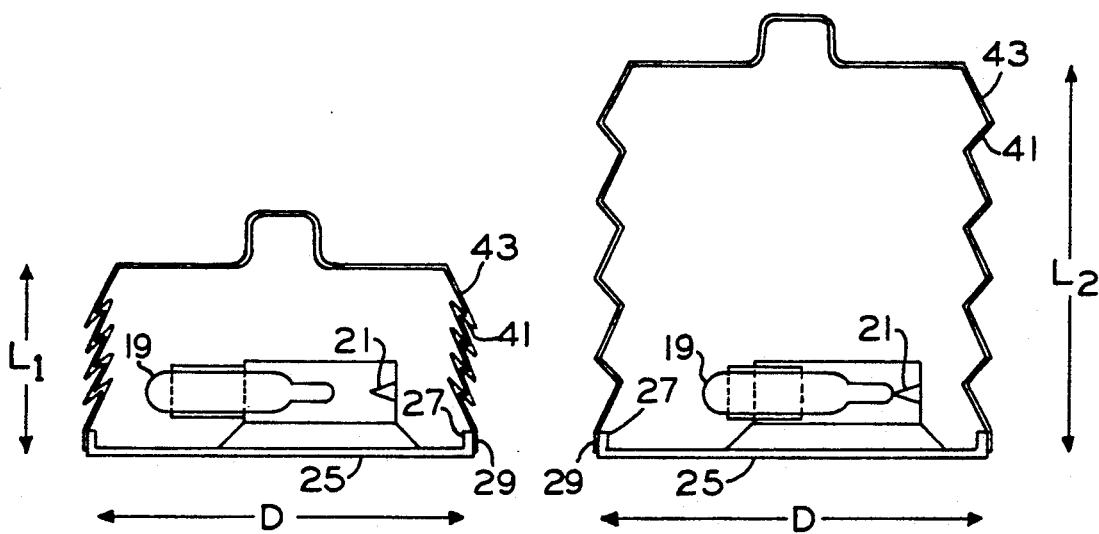
FIG. 5 is a view in cross-section of a portion of the sidewall of another float similar to the float in FIG. 1 and in the collapsed state.
FIG. 6 is a view in cross-section of a portion of the sidewall of the float of FIG. 5, but in the expanded state

In FIGS. 5 and 6, an adjacent pair of conical sidewall sections such as 41 and 43 are at an acute angle to one another when the float or bellows is collapsed as in FIG. 5 while they intersect in an obtuse angle when the float is inflated or expanded as in FIG. 6. If sidewall section 41 is somewhat shorter than sidewall portion 43, the natural resilience of the sidewall tends to maintain the collapsed volume configuration of FIG. 5 as well as maintaining the expanded volume configuration of FIG. 6. In this case, the float has two natural stable configurations. On the other hand, the lengths of adjacent sidewall sections may be substantially equal as in FIGS. 2 and 3, and the strength of plate 22 relied on to maintain the collapsed configuration until the gas is released. In either case, the natural resilience of the sidewall portions tends to maintain a portion of the expanded volume configuration. Typically, the sealed region 23 will need to be pressurized above atmospheric pressure in order to expand the float sufficiently to provide the required buoyancy. This elevated pressure not only provides additional insurance against leakage into the region 23, but also allows for scuttling the buoy when desired.

Figure 7:
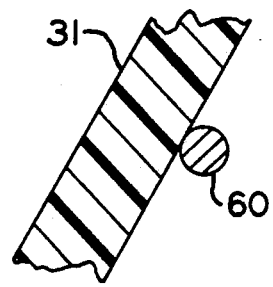
FIG. 7 is a fragmentary cross-sectional view of a portion of the float or bellows with a resistance wire affixed thereto.

Scuttling may rely on the natural resilience of the sidewall portion which tends to maintain the chamber at a volume which is intermediate or between the expanded volume and the collapsed volume. A resistance wire 60 may be affixed to the blow-molded plastic bellows 31 as shown in FIG. 7 and overheated on command or after the expiration of a predetermined time to heat and melt a hole in the side or end of the bellows. When this happens, the air pressure within the float is reduced to atmospheric pressure and the axial length of the float is reduced to its intermediate unstressed or natural length. The corresponding unstressed volume is inadequate to displace sufficient seawater to buoy up all the connected components and the buoy sinks. For example, the threaded retaining ring 32 atop the bellows 81 may hold a urethane membrane 64 in place and a resistance wire 62 may be attached between the ends of the antenna wires 87 and 39 as depicted in FIG. 8. When the wire is heated, the membrane ruptures and the bellows at least partially collapses. Thus, the resistance wire provides a way to reduce the pressure within the chamber so that the natural resilience of the sidewall portion reduces the chamber volume.

In transitioning from FIG. 2 to FIG. 3, the axial length of the float is significantly increased from L1 to L2 and the sidewall length that had been consumed in a zig-zag pattern now provides significant axial extension resulting in greatly increased buoyancy. The mean diameter D of the float is substantially unchanged between the figures. Thus, for either of the cylindrical configurations shown, the volume is directly proportional to the length of the float and may experience anywhere from double to a five or six-fold increase upon inflation.

From the foregoing, it is now apparent that a novel buoy surface unit arrangement has been disclosed meeting the objects and advantageous features set out hereinbefore as well as others. and that numerous modifications as to the precise shapes, configurations and details may be made by those having ordinary skill in the art without departing from the spirit of the invention or the scope thereof as set out by the claims which follow.

What is claimed is:

1. A surface unit for a buoy comprising a variable volume sealed chamber formed of a semi-rigid plastic cup having a corrugated sidewall portion and a closed end portion, and a rigid base member sealed to the cup sidewall portion forming in conjunction therewith the variable volume sealed chamber, the variable volume sealed chamber having a relatively constant surface area, and means within the sealed chamber and operable when energized for increasing the chamber volume from a collapsed volume to an expanded volume which is significantly greater than the collapsed volume, wherein the natural resilience of the sidewall portion tends to maintain the chamber at a volume intermediate the expanded volume and the collapsed volume, the surface unit further comprising means for reducing the pressure within the chamber whereby the natural resilience of the sidewall portion reduces the chamber volume.

2. The surface unit of claim 1 further comprising a radio transmitter antenna included within the sealed chamber, the antenna comprising at least one elongated flexible conductor having one end fastened to the closed end portion and another end fastened to the rigid base member.

3. The surface unit of claim 1 further comprising a radio transmitter antenna and radio transmitter circuitry included within the sealed chamber, the radio transmitter circuitry being supported on the rigid base member, and coupled to the radio transmitter antenna.

4. The surface unit of claim 1 wherein the closed end portion of the plastic cup includes a membrane, a retainer ring for holding the membrane in place, and a resistance wire for heating the membrane causing the membrane to rupture unsealing the chamber.

5. The surface unit of claim 4 further comprising at win lead radio transmitter antenna included within the sealed chamber, the radio transmitter antenna adapted to selectively provide current to the resistance wire.

6. A surface unit for a buoy comprising a variable volume sealed chamber including a semi-rigid plastic cup having a corrugated sidewall portion and a closed end portion, means within the sealed chamber and operable when energized for extending the corrugated sidewall portion thereby increasing the chamber volume from a collapsed volume to an expanded volume significantly greater than the collapsed volume, the corrugated sidewall portion having two natural stable configurations caused by a natural resilience which tends to maintain the chamber volume at the expanded volume and also tends to maintain the chamber volume at the collapsed volume, the variable volume sealed chamber further including a rigid base member sealed to the cup sidewall portion remote from the closed end and describing the other of the chamber ends, radio transmitter circuitry included within the sealed chamber, and a radio transmitter antenna included within the sealed chamber and coupled to the radio transmitter circuitry, the radio transmitter circuitry being supported by the rigid base member and the antenna extending therefrom to the closed end of the cup.

7. A surface unit for a buoy comprising a variable volume sealed chamber including a rigid base member which forms a sealing portion of the sealed chamber, the sealed chamber having a relatively constant surface area and including a membrane, a retaining ring for holding the membrane in place and a resistance wire for heating the membrane causing the membrane to rupture unsealing the chamber, means within the sealed chamber and operable when energized for increasing the chamber volume from a collapsed volume to an expanded volume which is significantly greater than the collapsed volume, radio transmitter circuitry mounted on the rigid base member and included within the sealed chamber, and a radio transmitter antenna included within the sealed chamber and coupled to the radio transmitter circuitry.

8. The surface unit of claim 7 wherein the radio transmitter antenna comprises a twin lead transmitter antenna included within the sealed chamber and adapted to selectively provide current to the resistance wire.

* * * * *